(12) United States Patent
Strunk (10) Patent No.: US 10,024,469 B2
(45) Date of Patent: Jul. 17, 2018

(54) SEALING DEVICES, BUSHING, AND SYSTEMS INCLUDING THE SAME

(71) Applicant: Titeflex Corporation, Springfield, MA (US)

(72) Inventor: Jordan Strunk, Portland, TN (US)

(73) Assignee: Titeflex Corporation, Springfield, MA (US)

( * ) Notice: Subject to any disclaimer, the term of this patent is extended or adjusted under 35 U.S.C. 154(b) by 382 days.

(21) Appl. No.: 14/927,575

(22) Filed: Oct. 30, 2015

(65) Prior Publication Data

US 2016/0123506 A1    May 5, 2016

Related U.S. Application Data (60) Provisional application No. 62/074,756, filed on Nov. 4, 2014.

(51) Int. Cl.
| | |
|---|---|
| *F16L 21/06* | (2006.01) |
| *F16L 25/00* | (2006.01) |
| *F16L 25/01* | (2006.01) |
| *F16L 33/22* | (2006.01) |
| *F16L 33/26* | (2006.01) |

(52) U.S. Cl.
CPC .......... *F16L 25/0036* (2013.01); *F16L 25/01* (2013.01); *F16L 33/224* (2013.01); *F16L 33/26* (2013.01)

(58) Field of Classification Search
CPC . F16L 19/065; F16L 25/0036; F16L 25/0054; F16L 33/01; F16L 33/26; F16L 33/224; F16L 37/0925
See application file for complete search history.

(56) References Cited

U.S. PATENT DOCUMENTS

| | | | | |
|---|---|---|---|---|
| 2,877,027 | A | * 3/1959 | Bagnell | ................... F16L 33/18 285/113 |
| 3,189,370 | A | 6/1965 | Marshall | |
| 3,233,924 | A | * 2/1966 | Stanley | ............... F16L 19/0206 285/148.19 |
| 4,063,757 | A | 12/1977 | Führmann | |
| 4,230,349 | A | * 10/1980 | Normark | ............... F16L 19/061 285/342 |
| 4,440,425 | A | 4/1984 | Pate et al. | |
| 4,630,850 | A | * 12/1986 | Saka | ................... F16L 25/0036 285/322 |

(Continued)

*Primary Examiner* — Aaron M Dunwoody
(74) *Attorney, Agent, or Firm* — Saul Ewing Arnstein & Lehr LLP; Brian R. Landry (57) ABSTRACT

One aspect of the invention provides a sealing device for connecting a length of corrugated tubing. The sealing device includes: a body member defining a sleeve portion; a nut adapted and configured for threaded engagement with the body member, the nut defining an internal shoulder; and a bushing. The bushing includes: an annular internal rib located on a proximal end, the annular internal rib adapted and configured to engage a corrugation valley of corrugated tubing; a medial external rib adapted and configured to be engaged by the internal shoulder of the nut and to advance the bushing within the sleeve portion of the body member; and a trailing hinged portion located on a distal end. The trailing hinged portion is adapted and configured for inward compression against the corrugated tubing received within the bushing as the nut is advanced over the trailing hinged portion.

16 Claims, 8 Drawing Sheets

Proximal End                                              Distal End

(56) References Cited

U.S. PATENT DOCUMENTS

| | | | |
|---|---|---|---|
| 4,666,192 A * | 5/1987 | Zamora | F16L 33/221 |
| | | | 285/257 |
| 4,805,942 A | 2/1989 | Goodridge | |
| 6,173,995 B1 | 1/2001 | Mau | |
| 6,241,291 B1 * | 6/2001 | Hui-Chen | F16L 19/075 |
| | | | 285/249 |
| 6,908,114 B2 | 6/2005 | Moner | |
| 7,350,828 B2 | 4/2008 | Williams | |
| 7,455,328 B2 * | 11/2008 | Chelchowski | F16L 19/086 |
| | | | 285/247 |
| 7,607,700 B2 | 10/2009 | Duquette et al. | |
| 7,621,567 B2 | 11/2009 | Duquette et al. | |
| 7,690,693 B2 | 4/2010 | Moner et al. | |
| 7,690,695 B2 | 4/2010 | Duquette et al. | |
| 8,308,201 B2 | 11/2012 | Duquette et al. | |
| 8,399,767 B2 | 3/2013 | Duquette et al. | |
| 8,616,229 B2 | 12/2013 | Jacoway | |
| 8,851,527 B2 | 10/2014 | Treichel et al. | |
| 9,651,177 B2 * | 5/2017 | Nielinger | F16L 15/04 |
| 2004/0155463 A1 * | 8/2004 | Moner | F16L 25/0036 |
| | | | 285/322 |
| 2007/0013189 A1 | 1/2007 | Duquette et al. | |
| 2007/0029795 A1 * | 2/2007 | Moner | F16L 25/0036 |
| | | | 285/245 |
| 2007/0284878 A1 | 12/2007 | Duquette et al. | |
| 2008/0012300 A1 | 1/2008 | Duquette et al. | |
| 2010/0090459 A1 | 4/2010 | Duquette et al. | |
| 2010/0181760 A1 | 7/2010 | Duquette et al. | |
| 2010/0201124 A1 * | 8/2010 | Duquette | F16L 19/025 |
| | | | 285/382.7 |
| 2011/0041944 A1 | 2/2011 | Duquette et al. | |
| 2012/0049509 A1 | 3/2012 | Lininger et al. | |
| 2012/0175874 A1 * | 7/2012 | Newall | F16L 19/086 |
| | | | 285/389 |
| 2013/0087381 A1 | 4/2013 | Daughtry et al. | |
| 2014/0333066 A1 * | 11/2014 | Strunk | F16L 19/00 |
| | | | 285/374 |
| 2017/0159858 A1 * | 6/2017 | Strunk | F16L 25/0054 |

* cited by examiner

SEALING DEVICES, BUSHING, AND SYSTEMS INCLUDING THE SAME

CROSS-REFERENCE TO RELATED APPLICATION

This application claims priority under 35 U.S.C. § 119(e) to U.S. Provisional Patent Application Ser. No. 62/074,756, filed Nov. 4, 2014. The entire content of this application is hereby incorporated by reference herein.

BACKGROUND OF THE INVENTION

Gas and liquid piping systems utilizing corrugated stainless steel tubing ("CSST") and fittings are known. Such piping systems can be designed for use in combination with elevated pressures of up to about 25 psi or more and provide advantages over traditional rigid black iron piping systems in terms of ease and speed of installation, elimination of onsite measuring, and reduction in the need for certain fittings such as elbows, tees, and couplings.

Oftentimes, electrical currents will occur inside a structure. These electrical currents, which can vary in duration and magnitude, can be the result of power fault currents or induced currents resulting from lightning interactions with a house or structure. The term "fault current" is typically used to describe an overload in an electrical system, but is used broadly herein to include any electrical current that is not normal in a specific system. These currents can be the result of any number of situations or events such as a lightning event. Electrical currents from lightning can reach a structure directly or indirectly. Direct currents result from lightning that attaches to the actual structure or a system contained within the structure. When current from a nearby lightning strike moves through the ground or other conductors into a structure, it is referred to as indirect current. While both direct and indirect currents may enter a structure through a particular system, voltage can be induced in other systems in the structure, especially those in close proximity to piping systems. This can result in an electrical flashover or arc between the adjacent systems. A flashover occurs when a large voltage differential exists between two electrical conductors, the air ionizes, and the material between the conductive bodies are punctured by the high voltage to form a spark.

SUMMARY OF THE INVENTION

One aspect of the invention provides a sealing device for connecting a length of corrugated tubing. The sealing device includes: a body member defining a sleeve portion; a nut adapted and configured for threaded engagement with the body member, the nut defining an internal shoulder; and a bushing. The bushing includes: an annular internal rib located on a proximal end, the annular internal rib adapted and configured to engage a corrugation valley of corrugated tubing; a medial external rib adapted and configured to be engaged by the internal shoulder of the nut and to advance the bushing within the sleeve portion of the body member; and a trailing hinged portion located on a distal end. The trailing hinged portion is adapted and configured for inward compression against the corrugated tubing received within the bushing as the nut is advanced over the trailing hinged portion. Either the nut includes an internal taper or the trailing hinged portion of the bushing includes an external taper.

This aspect of the invention can have a variety of embodiments. The trailing hinged portion can be defined by living hinge. The trailing hinged portion can be defined by a bearing.

The trailing hinged portion can define a plurality of contact points. The plurality of contact points can include a first contact point adapted and configured to form electrical continuity with a conductive layer of the corrugated tubing. The first contact point can be adapted and configured to contact the conductive layer over a corrugation peak of the corrugated tubing. The plurality of contact points can include a second contact point adapted and configured to press against an external layer of the corrugated tubing.

Another aspect of the invention provides a system including: a fitting as described herein; and a length of corrugated tubing received within the fitting, such that the trailing hinged portion of the bushing is inwardly compressed against the length of corrugated tubing by the nut.

This aspect of the invention can have variety of embodiments. The trailing hinged portion can define a plurality of contact points including: a first contact point adapted and configured to form electrical continuity with a conductive layer of the corrugated tubing; and a second contact point adapted and configured to press against an external layer of the corrugated tubing. The first contact point can be adapted and configured to contact the conductive layer over a corrugation peak of the corrugated tubing.

Another aspect of the invention provides a bushing including: an annular internal rib located on a proximal end, the annular internal rib adapted and configured to engage a corrugation valley of corrugated tubing; a medial external rib; and a trailing hinged portion located on a distal end. The trailing hinged portion includes an external taper increasing in diameter from the distal end. The trailing hinged portion is adapted and configured for inward compression against the corrugated tubing received within the bushing as a nut is advanced over the trailing hinged portion.

This aspect of the invention can have a variety of embodiments. The trailing hinged portion can be defined by a living hinge. The trailing hinged portion can be defined by a bearing. The trailing hinged portion can define a plurality of contact points. The plurality of contact points can include a first contact point adapted and configured to form electrical continuity with a conductive layer of the corrugated tubing.

Another aspect of the invention provides a system including: a body member defining a sleeve portion; a nut adapted and configured for threaded engagement with the body member, the nut defining an internal shoulder; a bushing as described herein received within the sleeve portion of the body member; and a length of corrugated tubing received within the bushing. The trailing hinged portion of the bushing is inwardly compressed against the length of corrugated tubing by the nut.

This aspect of the invention can have a variety of embodiments. The trailing hinged portion can define a plurality of contact points including: a first contact point adapted and configured to form electrical continuity with a conductive layer of the corrugated tubing; and a second contact point adapted and configured to press against an external layer of the corrugated tubing. The first contact point can be adapted and configured to contact the conductive layer over a corrugation peak of the corrugated tubing.

BRIEF DESCRIPTION OF THE DRAWINGS

For a fuller understanding of the nature and desired objects of the present invention, reference is made to the following detailed description taken in conjunction with the accompanying drawing figures wherein like reference characters denote corresponding parts throughout the several views.

DEFINITIONS

The instant invention is most clearly understood with reference to the following definitions.

As used herein, the singular form "a," "an," and "the" include plural references unless the context clearly dictates otherwise.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from context, all numerical values provided herein are modified by the term about.

As used herein, the term "alloy" refers to a homogenous mixture or metallic solid solution composed of two or more elements. Examples of alloys include austenitic nickel-chromium-based superalloys, brass, bronze, steel, low carbon steel, phosphor bronze, stainless steel, and the like.

As used in the specification and claims, the terms "comprises," "comprising," "containing," "having," and the like can have the meaning ascribed to them in U.S. patent law and can mean "includes," "including," and the like.

As used herein, the terms "corrugated stainless steel tubing" and "CSST" refer to any type of semi-flexible tubing or piping that can accommodate corrosive or aggressive gases or liquids. In some embodiments, CSST is designed and/or approved for conveyance of fuel gases such as natural gas, methane, propane, and the like. For example, CSST can comply with a standard such as the ANSI LC 1-2005/CSA 6.26-2005 Standard for Fuel Gas Piping Systems Using Corrugated Stainless Steel Tubing. The inventions described herein can be utilized in conjunction with all commercially available CSST products including, but not limited to CSST sold under the GASTITE® and FLASHSHIELD® brands by Titeflex Corporation of Portland, Tenn.; the TRACPIPE® and COUNTERSTRIKE® brands by OmegaFlex, Inc. of Exton, Pa.; the WARDFLEX® brand by Ward Manufacturing of Blossburg, Pa.; the PRO-FLEX® brand by Tru-Flex Metal Hose Corp. of Hillsboro, Ind.; and the DIAMOND-BACK™ brand by Metal Fab, Inc. of Wichita, Kans.

Unless specifically stated or obvious from context, the term "or," as used herein, is understood to be inclusive.

As used herein, the term "metal" refers to any chemical element (or compound or alloy thereof) that is a good conductor of electricity and/or heat. Examples of metals include, but are not limited to, aluminum, cadmium, niobium (also known as "columbium"), copper, gold, iron, nickel, platinum, silver, tantalum, titanium, zinc, zirconium, and the like.

As used herein, the term "resin" refers to any synthetic or naturally occurring polymer.

Ranges provided herein are understood to be shorthand for all of the values within the range. For example, a range of 1 to 50 is understood to include any number, combination of numbers, or sub-range from the group consisting 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 (as well as fractions thereof unless the context clearly dictates otherwise).

DETAILED DESCRIPTION OF THE INVENTION

Corrugated Tubing

Figure 1A:
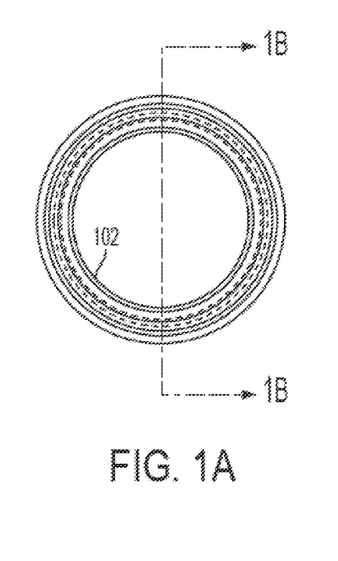
FIGS. 1A and 1B depict a multi-layer jacketed tube in accordance with the prior art.
Figure 1B:
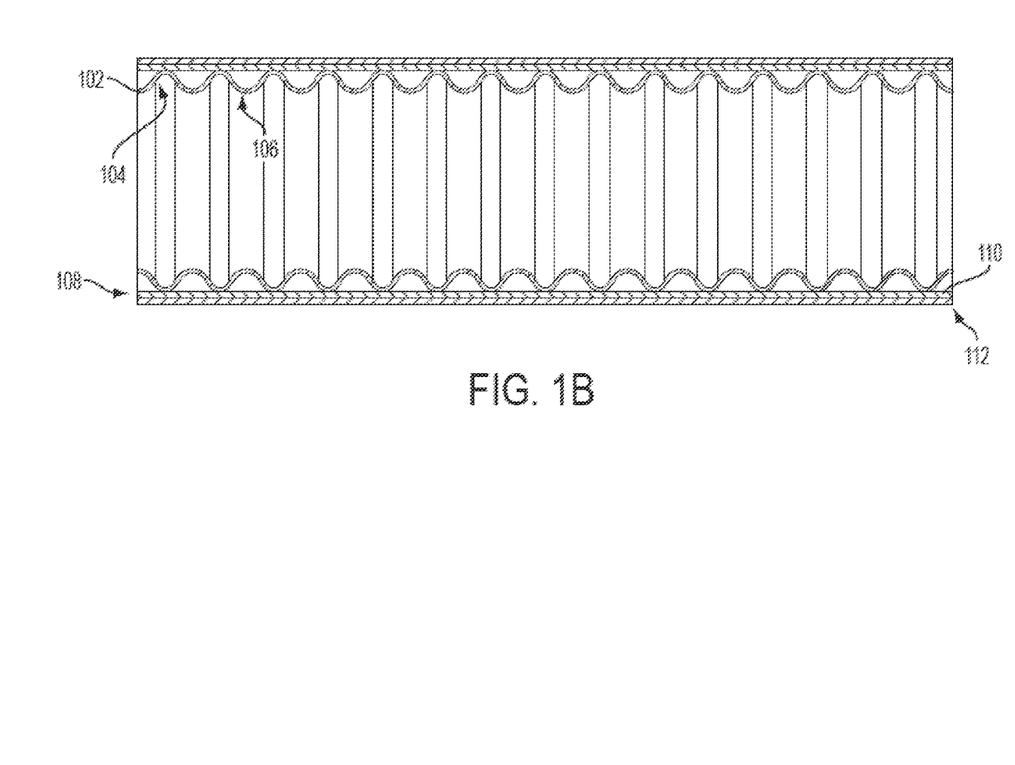
Figure 2A:
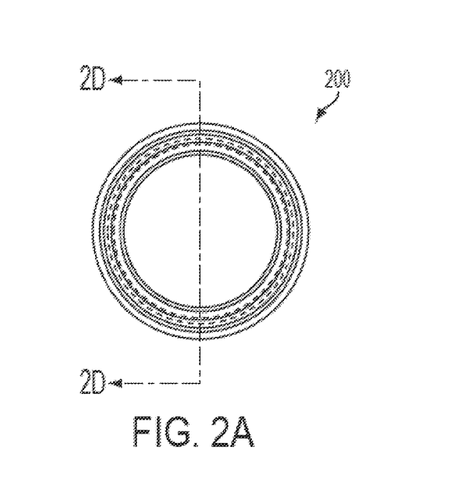
FIGS. 2A-2D depict an energy dissipative tube in accordance with the prior art.
Figure 2B:
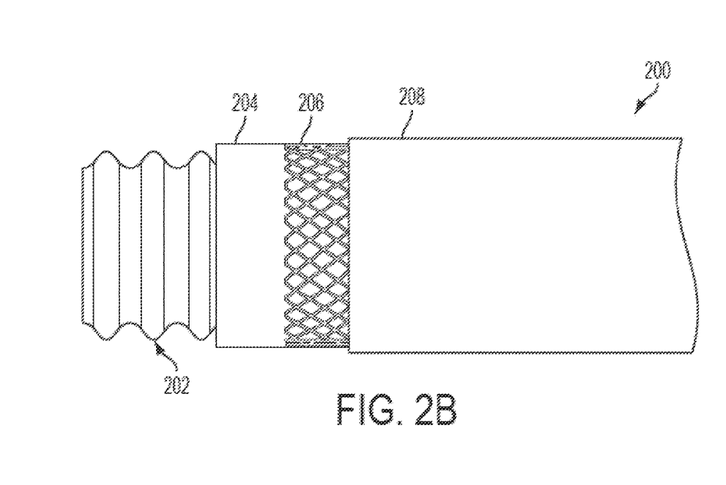
Figure 2C:
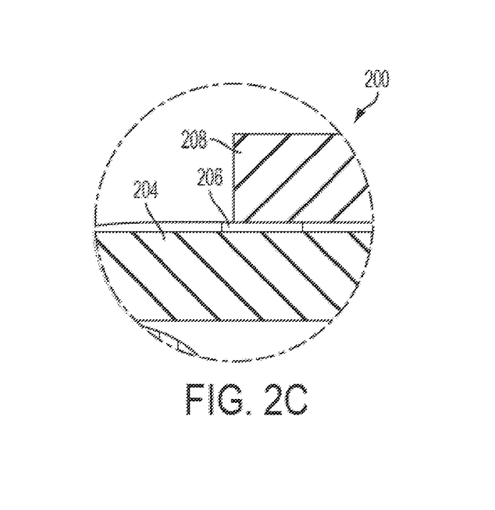
Figure 2D:
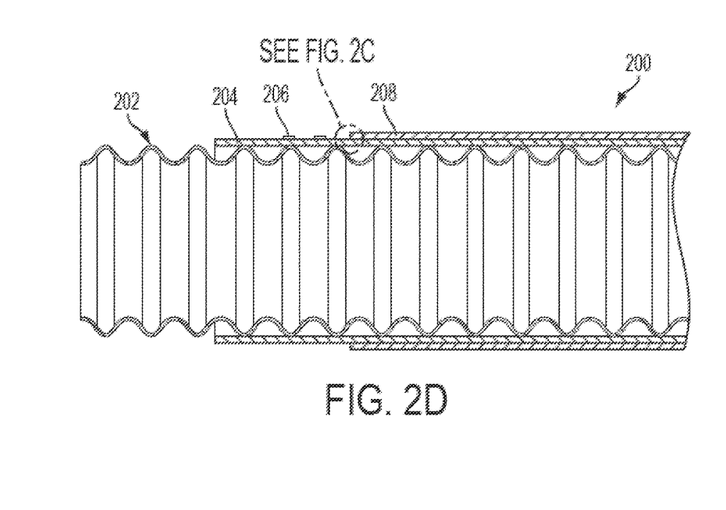

Referring to FIGS. 1A and 1B, a length of corrugated tubing 102 according to the prior art is provided. The corrugated tubing 102 may be composed of stainless steel or any other suitable material. The tubing 102 contains a number of corrugation peaks 104 and corrugation valleys 106. A jacket 108 (e.g., a multi-layer jacket) covers the outside of the tubing 102.

The jacket 108 can include a plurality of layers 110, 112. The layers 110, 112 generally form an annulus around the tubing 102, but may have a circular or non-circular cross-section.

Energy Dissipative Tubing

Referring now to FIGS. 2A-2D, in order to better absorb energy from fault currents and direct or indirect lightning strikes, energy dissipative jackets are provided that dissipate electrical and thermal energy throughout the respective jackets, thereby protecting the tubing 202. The term "dissipate" encompasses distributing electrical energy to an appropriate grounding device such as a fitting.

Preferred embodiments of energy dissipative jackets preferably include one or more conductive layers for distributing electricity and heat. The conductive layers can include, for example, conductive resins and/or metals as discussed herein.

One embodiment of energy dissipative tubing 200 is depicted in FIGS. 2A-2D. The energy dissipative tubing 200 includes a length of tubing 202. The tubing 202 can be metal tubing, thin-walled metal tubing, corrugated tubing, corrugated stainless steel tubing, or the like.

Tubing 202 is surrounded by a first resin layer 204, a metal layer 206, and a second resin layer 208. Resin layers 204, 208 can be formed from insulative and/or conductive resins.

Insulating resin layers can be formed from a variety of materials. In some embodiments, an insulating elastic layer includes polytetrafluoroethylene (PTFE). Other suitable insulators include polyolefin compounds, thermoplastic polymers, thermoset polymers, polymer compounds, polyethylene, crosslinked polyethylene, UV-resistant polyethylene, ethylene-propylene rubber, silicone rubber, polyvinyl chloride (PVC), ethylene tetrafluoroethylene (ETFE), and ethylene propylene diene monomer (EPDM) rubber.

Conductive resin layers can be formed by impregnating a resin with conductive material such as metal particles (e.g., copper, aluminum, gold, silver, nickel, and the like), carbon black, carbon fibers, or other conductive additives. In some embodiments, the metal layer 206 and/or one or more of the resin layers 204, 208 has a higher electrical conductivity than the tubing 202. In some embodiments, the volume resistivity of the conductive resin can be less than about $10^6$ ohm-cm (e.g., $9 \times 10^6$ ohm-cm) as tested in accordance with ASTM standard D257.

In some embodiments, each resin layer 204, 208 has a thickness of about 0.015" to about 0.035".

Metal layer 206 can include one or more metals (e.g., ductile metals) and alloys thereof. The metal(s) can be formed into foils, perforated foils, tapes, perforated tapes, cables, wires, strands, meshes, braids, and the like.

In some embodiments, the metal layer 206 is an expanded metal foil as further described in U.S. Patent Application Publication No. 2011-0041944. A variety of expanded metal foils are available from the Dexmet Corporation of Wallingford, Conn. An exemplary embodiment of energy dissipative tubing 200 with expanded metal foil is depicted in FIGS. 2A-2D.

In some embodiments, the metal layer 206 completely surrounds the first resin layer 204. In such embodiments, the metal may overlap and/or be welded or soldered in some regions. In other embodiments, the metal layer 206 substantially surrounds the first resin layer 204. In such embodiments, a small portion of the first resin layer 204 (e.g., less than about 1°, less than about 2°, less than about 3°, less than about 4°, less than about 5°, less than about 10°, less than about 15°, less than about 20°, and the like) is not surrounded by the metal layer 26. In still other embodiments, the metal layer 206 can be wrapped spirally or helically around the first resin layer 204. In such an embodiment, the metal layer 206 can overlap or substantially surround the first resin layer 204

In some embodiments, the metal layer 206 is a conventional, non-expanded metal foil, such as aluminum or copper foil that can, in some embodiments, completely envelop the inner resin layer 206.

Various thicknesses of the resin layers 204, 208 and the metal layer 206 can be selected to achieve desired resistance to lightning strikes and physical damage while maintaining desired levels of flexibility. In embodiments including an expanded metal foil, the mass per area can be adjusted to provide an appropriate amount of energy dissipation. The resin layers 204, 208 can be the same or different thickness and can include the same or different materials. Various colors or markings can be added to resin layers, for example, to clearly distinguish the resin layers 204, 208 from each other and from the metal layer 206 and/or to make the tubing 200 more conspicuous.

Sealing Devices

Figure 3A:
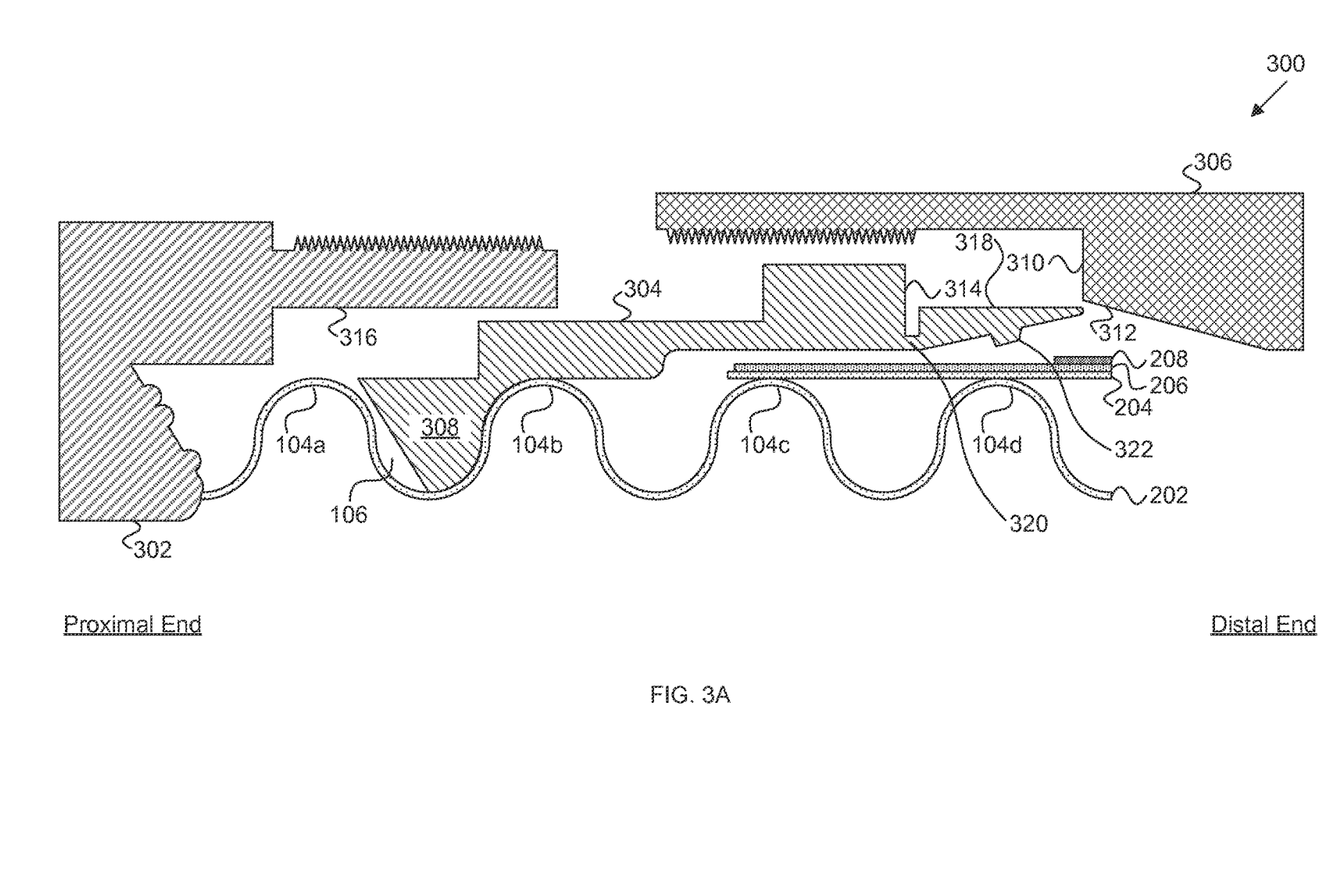
FIGS. 3A-3C depict partial cross-sections of a sealing device and tubing assembly in accordance with preferred embodiments of the invention.
Figure 3B:
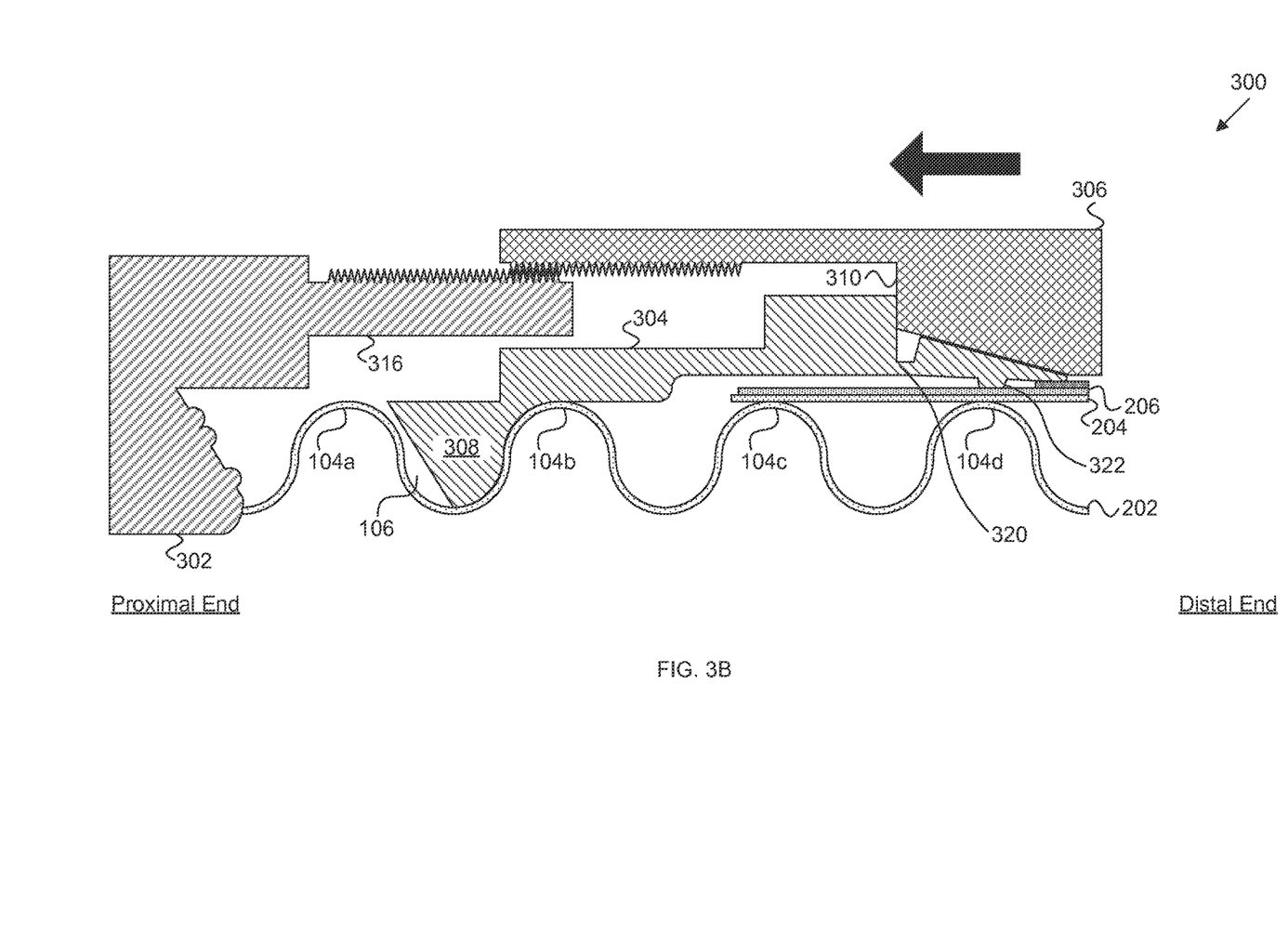
Figure 3C:
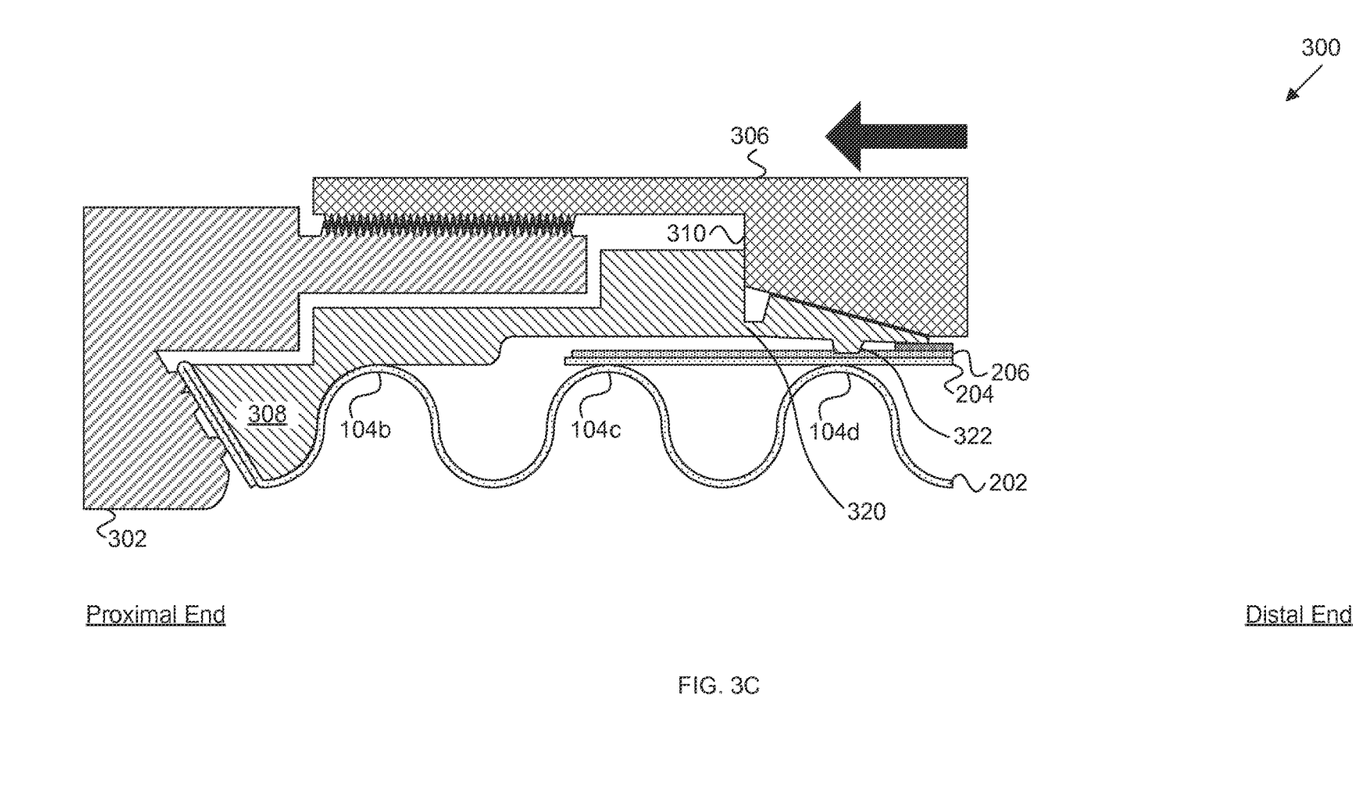

Referring now to FIGS. 3A-3C, a partial cross-sectional view of a sealing device 300 is provided. The sealing device 300 allows for the sealing and coupling of an end of tubing 200 to a pipe, a manifold, an appliance, and the like (not depicted). For example, after body member 302 is threaded into a manifold (not depicted), a nut 306 can be placed over an end of a length of tubing 200, a bushing 304 can be placed over an exposed corrugation peak 104b of the tubing, the tubing 200 and bushing 304 can be placed inside the sleeve portion 316 of the body member 302, and sealed by advancing the nut 306 as further discussed below.

Bushing 304 can include a first annular rib 308 adapted and configured to engage with a corrugation valley 106 (e.g., the first corrugation valley) of the corrugated tubing 202.

In one embodiment, the first annular rib 308 engages the first corrugation valley 106 of the tubing to facilitate the sealing of the tubing 202 against the body member 302. As the nut 306 is advanced, the first annular rib 308 of the bushing 304 presses the tubing 202 against the sealing face of the body member 302, causing the first corrugation peak 104a to collapse and form a gastight seal.

Body member 302 can include a sealing face having one or more annular sealing ridges adapted and configured to facilitate a metal-to-metal gastight seal. Such a sealing architecture is described in U.S. Pat. Nos. 7,607,700 and 7,621,567 and embodied in the XR2 fitting available from Titeflex Corporation of Portland, Tenn.

Nut 306 can have internal or external threads to mate with body member 302. In some embodiments, nut 306 can include a torque-limiting feature as described in U.S. Patent Application Publication No. 2013-0087381.

Although the assembly 300 can be used with a variety of types of CSST, the bushing 304 is particularly advantageous when used with energy dissipative tubing 200 having one or more conductive layers 206 such as described and depicted in FIG. 2.

The nut 306 can include a stop shoulder 310 and an internal taper 312 that narrows from a proximal end of the sealing device 300 toward the distal end.

Bushing 304 can include complimentary features including an external rib 314 adapted and configured to be engaged by the stop shoulder 310 of the nut 306 to drive the bushing 304 in the proximal direction within the sleeve portion 316 of the body member 302 as the nut 306 is threaded onto the body member 302. As the nut 306 is advanced, the internal taper 312 presses against a trailing hinged portion 318 of the bushing 304 and presses the trailing hinged portion 318 against one or more layers 206, 208 of the tubing 200.

Figure 4A:
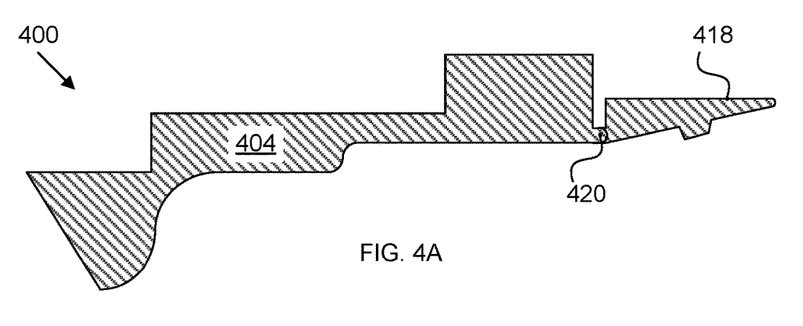
FIGS. 4A and 4B depict partial cross-sections of bushings in accordance with preferred embodiments of the invention.
Figure 4B:
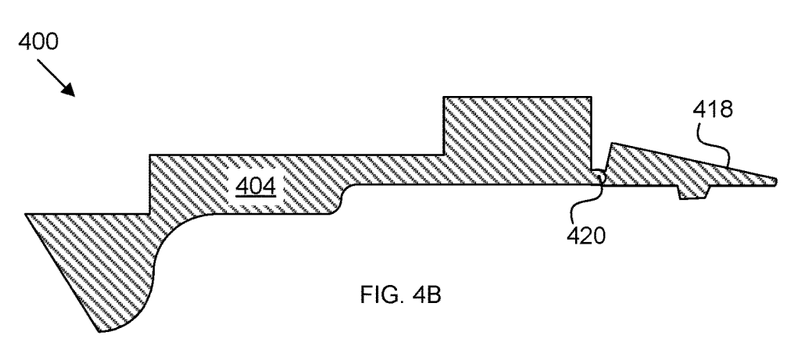

Flexing of the trailing hinged portion 318 of the bushing 304 can be facilitated through a variety of architectures. For example, the bushing 304 depicted in FIGS. 3A-3C can be a cast or machined from a metal having sufficient malleability to deform inwardly towards tubing 200 as the nut 306 is advanced proximally over the trailing hinged portion 318. For example, a brass bushing 304 can be cast with a sufficiently thin living hinge 320 to permit the desired flexion. In another embodiment depicted in FIGS. 4A and 4B, the trailing hinged portion 418 can move inward about a pin 420 coupling the trailing hinged portion 418 to the rest of the bushing 404.

Trailing hinged portion 318 can include one or more geometries adapted and configured to engage with one or more layers of the tubing 200. In one embodiment, the trailing hinged portion 318 engages with a conductive layer 206 and an outer resin layer 208. In order to best engage with both layers 206, 208, which will have different depths with regard to the trailing hinged portion 318, the trailing hinged portion 318 can include a protrusion 322 adapted and configured to extend beyond the inner profile of the trailing hinged portion 318. As can be seen in FIGS. 3B and 3C, such protrusion 322 will press against the conductive layer 206 when the distal end of the trailing hinged portion 318 presses against the outer resin layer 208.

Figure 3D:
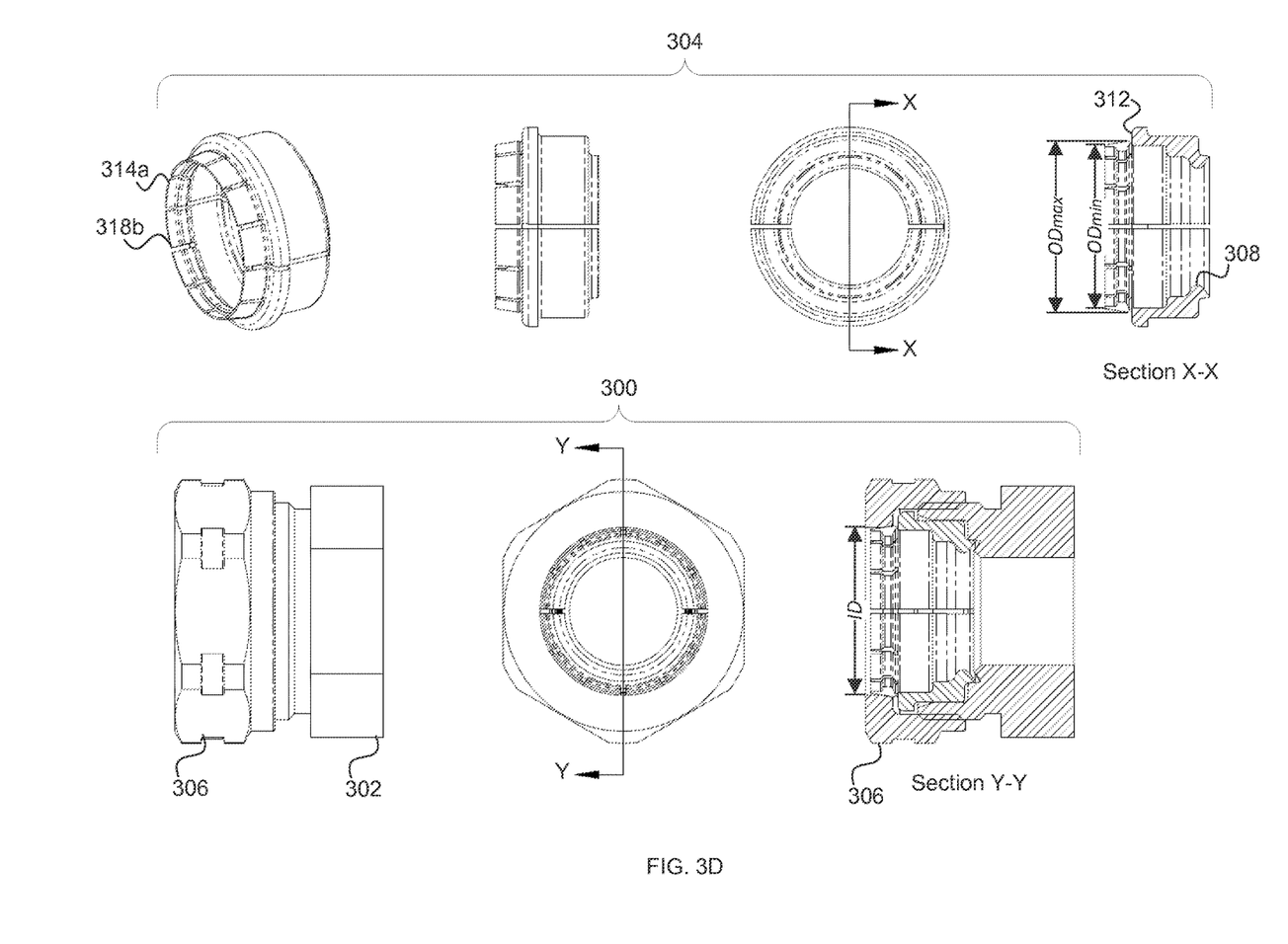
FIG. 3D depicts a sealing device in which the nut does not define an internal taper in accordance with preferred embodiments of the invention.

Although a single plane of the sealing device 300 is depicted in FIGS. 3A-3C in order to provide a more readable illustration, the trailing hinged portion 318 as well as the rest of the sealing device can continue substantially continuously to form a cylinder around the tubing 200 as depicted in FIG. 3D. In some embodiments, the trailing hinged portion 318 will be replicated as a plurality (e.g., 2, 3, 4, 5, 6, 7, 8, 9, 10, 11, 12, 13, 14, 15, 16, 17, 18, 19, 20, and the like) of finger-like trailing hinged portions 318 that can each deflect inwardly against the tubing 200. Spacing between each trailing hinged portion 318 can accommodate the decreased diameter available as the trailing hinged portions 318 are compressed inwardly.

Although the embodiment depicted in FIGS. 3A-3C engages trailing hinged portion 318 prior to threaded engagement of the nut 306 with the body member 302 or collapsing of the first corrugation peak 104, other embodiments of the sealing device can be configured to either first engage the nut 306 with the body member 302 and/or first collapse the first corrugation peak 104a. Such embodiments can then utilize the force generated by threaded advancement of the nut 306 over the body member to deflect trailing hinged portion(s) 318 inward and/or collapse the first corrugation peak 104.

Bushing 304 can, in some embodiments, be a split bushing. For example, bushing 304 can include two halves connected by a living hinge. A living hinge allows the bushing 304 to open to allow internal annular rib 308 to slide over one or more corrugation peaks 104 before resting in a corrugation groove 106 and allowing the bushing 304 to return to a substantially circular profile for engagement with body member 302. In other embodiments, the bushing 304 is a two-piece split bushing such that each half of the split bushing is individually positioned on the tubing prior to insertion into the sleeve portion 316 of the body member 302.

FIG. 3D depicts another embodiment of the invention in which the nut 306 does not include an internal taper. Instead, the trailing hinged portion(s) 318 can have an external taper as most clearly seen in Section X-X that can be engaged by the inner geometry of the nut 306, which can have a simple cylindrical profile or any other complementary shape. For example, the nut 306 can include an internal cylindrical profile at the distal end having an internal diameter ID that is greater than the smallest outer diameter $OD_{min}$ of the distal portion of the bushing 304 so that the nut 306 will slip over the distal portion of the bushing 304, but less than the largest outer diameter $OD_{min}$ of the distal portion of the bushing 304 so that advancement of the nut 306 will compress the trailing hinged portion(s) 318.

The trailing hinged portions can be sized to press against one or more jacket layers when the bushing 304 is first placed over the tubing 200. The pressure subsequently applied as the nut 306 is advanced can then enhance the contact between the trailing hinged portion(s) 318 and the one or more jacket layers of the tubing 200.

In some embodiments of the invention, the bushing 304 is dimensioned so that the trailing hinged portion(s) 318 and particularly any protrusion 322 contact the conductive layer 206 above a corrugation peak such as the third corrugation peak 104c or the fourth corrugation peak 104d. Such a compression location promotes better electrical conductivity between the conductive layer 206 to the bushing 304 to the body member 302 and to ground through whatever the body member 302 engages. Additionally, embodiments of the invention merely press against the jacket layers 206, 208 instead of piercing or deforming jacket layers 206, 208. This approach requires less force by the user to push the split bushing 304 into the sleeve portion 316 prior to advancing the nut 306 to form a seal. Additionally, embodiments of the invention may require less material than existing sealing devices.

Methods of Installing Tubing

Figure 5:
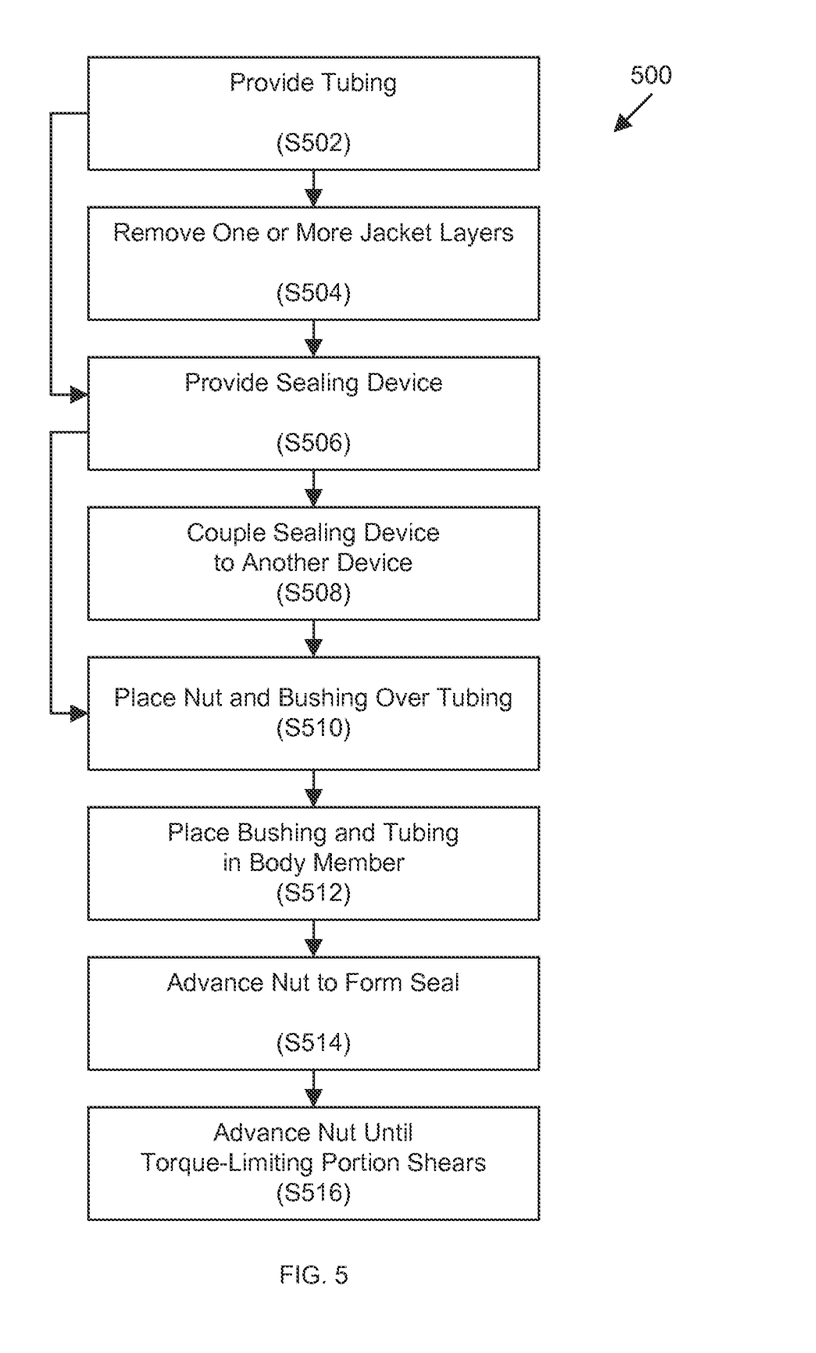
FIG. 5 depicts a method for installing energy dissipative tubing in accordance with preferred embodiments of the invention.

Tubing can be installed in accordance with existing techniques for the manufacture of CSST. An exemplary method 500 for installing energy dissipative tubing is depicted in FIG. 5.

In step S502, a length of tubing is provided. Tubing can, in some embodiments, be CSST such as unjacketed CSST, jacketed CSST, and energy-dissipative CSST. Tubing may be provided in lengths (e.g., 8' sticks) or on reels.

In step S504, one or more jacket layers are optionally removed in accordance with the instructions for a fitting. The one or more layers can be removed with existing tools such as a utility knife, a razor blade, a tubing cutter, a jacket-stripping tool, and the like. Preferably, all jacket layers are removed from a leading end of the tubing. For example, all jacket layers can be removed to expose at least the first two corrugation peaks. Additionally, one or more outer jacket layers can be further removed to expose the conductive layer in a region corresponding to the second, third, or fourth annular rib.

In step S506, a sealing device is provided including a body member defining a sleeve portion, a bushing, and a nut as described herein.

In step S508, the sealing device is optionally coupled to another device. For example, the sealing device can be coupled to a source of a fuel gas such as a pipe, a manifold, a meter, a gas main, a tank, and the like. In another example, the sealing device can be coupled to an appliance that consumes a fuel gas such as a stove, an oven, a grill, a furnace, a clothes dryer, a fire place, a generator, and the like. The sealing device can be coupled to the other device by threaded or other attachments. In some circumstances, pipe seal tape (e.g., polytetrafluoroethylene tape) or pipe seal compound (commonly referred to as "pipe dope") is utilized to facilitate a gastight seal between the sealing device and the other device.

In step S510, the nut and the bushing are placed over the tubing. The bushing can be positioned such that the inner annular rib engages with a first complete corrugation groove.

In step S512, the bushing and tubing are placed within a sleeve portion of the body member.

In step S514, a nut is advanced to form a seal. The nut can be advanced by rotating the nut to engage threads in the sleeve portion of the body member. As the nut advances, a trailing hinged portion of the bushing is pressed against a conductive layer of the tubing to form electrical continuity with the conductive layer. The electrical continuity can be sufficient to dissipate electricity from a direct or indirect lightning strike to the bushing without failure of the tubing.

In step S516, the nut is optionally tightened until a torque-limiting portion of the nut is activated. For example, a portion of the nut may shear off when a predetermined amount of torque is applied to the nut.

EQUIVALENTS

Although preferred embodiments of the invention have been described using specific terms, such description is for illustrative purposes only, and it is to be understood that changes and variations may be made without departing from the spirit or scope of the following claims.

INCORPORATION BY REFERENCE

The entire contents of all patents, published patent applications, and other references cited herein are hereby expressly incorporated herein in their entireties by reference.

The invention claimed is:
1. A system comprising:
a sealing device for connecting a length of corrugated tubing, the sealing device comprising:

a body member defining a sleeve portion;

a nut adapted and configured for threaded engagement with the body member, the nut defining an internal shoulder; and a bushing comprising:

an annular internal rib located on a proximal end, the annular internal rib adapted and configured to engage a corrugation valley of corrugated tubing;

a medial external rib adapted and configured to be engaged by the internal shoulder of the nut and to advance the bushing within the sleeve portion of the body member; and a trailing hinged portion located on a distal end, the trailing hinged portion adapted and configured for inward compression against the corrugated tubing received within the bushing as the nut is advanced over the trailing hinged portion;

wherein either the nut includes an internal taper or the trailing hinged portion of the bushing includes an external taper; and a length of corrugated tubing received within the sealing device, such that the trailing hinged portion of the bushing is inwardly compressed against the length of corrugated tubing by the nut.

2. The system of claim 1, wherein the trailing hinged portion is defined by living hinge.

3. The system of claim 1, wherein the trailing hinged portion is defined by a bearing.

4. The system of claim 1, wherein the trailing hinged portion defines a plurality of contact points.

5. The system of claim 4, wherein the plurality of contact points includes a first contact point adapted and configured to form electrical continuity with a conductive layer of the corrugated tubing.

6. The system of claim 5, wherein the first contact point is adapted and configured to contact the conductive layer over a corrugation peak of the corrugated tubing.

7. The system of claim 4, wherein the plurality of contact points includes a second contact point adapted and configured to press against an external layer of the corrugated tubing.

8. The system of claim 1, wherein the trailing hinged portion defines a plurality of contact points including:

a first contact point adapted and configured to form electrical continuity with a conductive layer of the corrugated tubing; and a second contact point adapted and configured to press against an external layer of the corrugated tubing.

9. The system of claim 8, wherein the first contact point is adapted and configured to contact the conductive layer over a corrugation peak of the corrugated tubing.

10. A system comprising:

a body member defining a sleeve portion;

a nut adapted and configured for threaded engagement with the body member, the nut defining an internal shoulder;

a bushing received within the sleeve portion of the body member, the bushing comprising:

an annular internal rib located on a proximal end, the annular internal rib adapted and configured to engage a corrugation valley of corrugated tubing;

a medial external rib; and a trailing hinged portion located on a distal end, the trailing hinged portion including an external taper increasing in diameter from the distal end, the trailing hinged portion adapted and configured for inward compression against the corrugated tubing received within the bushing as a nut is advanced over the trailing hinged portion; and a length of corrugated tubing received within the bushing, such that the trailing hinged portion of the bushing is inwardly compressed against the length of corrugated tubing by the nut.

11. The system of claim 10, wherein the trailing hinged portion is defined by a living hinge.

12. The system of claim 10, wherein the trailing hinged portion is defined by a bearing.

13. The system of claim 10, wherein the trailing hinged portion defines a plurality of contact points.

14. The system of claim 13, wherein the plurality of contact points includes a first contact point adapted and configured to form electrical continuity with a conductive layer of the corrugated tubing.

15. The system of claim 10, wherein the trailing hinged portion defines a plurality of contact points including:

a first contact point adapted and configured to form electrical continuity with a conductive layer of the corrugated tubing; and a second contact point adapted and configured to press against an external layer of the corrugated tubing.

16. The system of claim 15, wherein the first contact point is adapted and configured to contact the conductive layer over a corrugation peak of the corrugated tubing.

* * * * *